United States Patent [19]
Hostetler

[11] Patent Number: 5,410,366
[45] Date of Patent: Apr. 25, 1995

[54] CIRCUIT AND METHOD OF CLAMPING A VIDEO SIGNAL WITH FIRST AND SECOND CURRENT SOURCES

[75] Inventor: David A. Hostetler, Rolling Hills Estates, Calif.

[73] Assignee: Motorola, Inc., Schaumburg, Ill.

[21] Appl. No.: 143,701

[22] Filed: Nov. 1, 1993

[51] Int. Cl.6 ............................................. H04N 5/08
[52] U.S. Cl. .................................... 348/695; 348/691
[58] Field of Search ............... 348/691, 692, 693, 694, 348/695, 696, 697; 307/546, 555, 552, 540; 328/139, 135, 168, 172, 173, 175; H04N 5/08, 5/16, 5/18, 9/72; 358/171, 172

[56] References Cited

U.S. PATENT DOCUMENTS 5,027,017  6/1991  Fling .............................. 307/562 X

FOREIGN PATENT DOCUMENTS

| | | | |
|---|---|---|---|
| 0064316 | 11/1982 | European Pat. Off. | ............. 358/171 |
| 2604583 | 4/1988 | France | ............................ H04N 5/16 |
| 3817421 | 2/1990 | Germany . | |
| 0208386 | 9/1986 | Japan | ................... 358/172 |
| 0210770 | 9/1986 | Japan | .............................. H04N 5/18 |
| 0165482 | 7/1987 | Japan | .............................. H04N 5/18 |
| 0258560 | 10/1989 | Japan | .............................. H04N 5/18 |
| 004471 | 2/1992 | Japan | .............................. H04N 5/16 |
| 0117074 | 4/1992 | Japan | .............................. H04N 5/08 |

Primary Examiner—James J. Groody
Assistant Examiner—David E. Harvey
Attorney, Agent, or Firm—Robert D. Atkins

[57] ABSTRACT

A clamping circuit clamps an input signal applied at an input pin of an integrated circuit package by charging and discharging a series capacitor into the input pin with first and second controlled current sources. The voltage developed at the input pin is compared against a reference signal in either the analog or digital domain to generate control signals to control the first and second current sources. The controlled current sources maintain the proper voltage across the series capacitor to clamp the voltage at the input pin. In the digital embodiment, an analog-to-digital converter and digital filter provide a filtered digital signal to compare against a digital reference to generate the control signals.

11 Claims, 8 Drawing Sheets

CIRCUIT AND METHOD OF CLAMPING A VIDEO SIGNAL WITH FIRST AND SECOND CURRENT SOURCES

BACKGROUND OF THE INVENTION

The present invention relates in general to clamping circuits and, more particularly, to a video clamping circuit for setting the signal level at an input pin of an integrated circuit to a predetermined value.

Clamping circuits are generally used to limit the voltage or current level at a particular node of interest. In television system applications, a video input signal is typically applied to one pin of an integrated circuit (IC). The video signal contains sync pulses, and reference bursts in the backporch regions, needed to decode the video information. The video signal is usually AC-coupled which causes the DC level of blanking and sync pulses to vary depending upon the average picture level (APL) of the video signal. That is, when the scene is bright, the APL is high and when the scene is dark the APL is low. To aid in reading the sync pulses and reference bursts, the DC level of the video signal should be clamped to a predetermined level at the input pin to the IC.

Many prior art clamping circuits require external capacitors to establish reference voltages to perform the clamping function. These capacitors tend to be large in order to maintain the appropriate reference voltage and therefore must be placed external to the IC. Accordingly, one or more additional pins of the IC package have to be dedicated to the reference capacitors. It is desirable to minimize pin count and associated package size needed to perform the clamping operation.

Another approach to establishing the internal reference voltage for the clamping circuit involves replacing the external capacitor with a digital-to-analog converter (DAC). An appropriate digital circuit drives the DAC to produce the needed reference voltage. However, there is considerable expense and additional complex circuitry for the DAC and its control circuit.

Hence, a need exists for a simple clamping circuit operating with a minimal number of IC pins.

DETAILED DESCRIPTION OF THE PREFERRED EMBODIMENT

Figure 1:
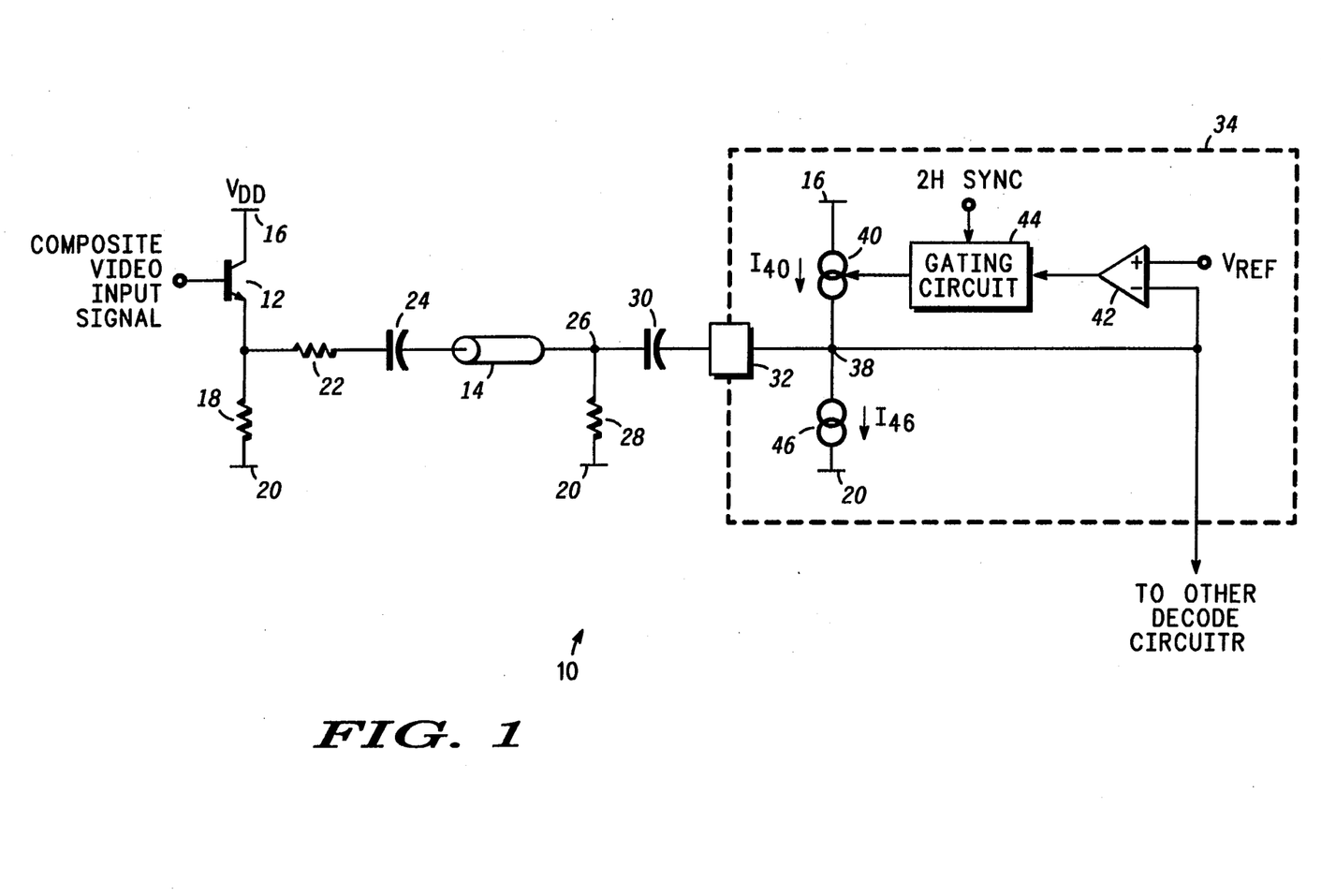
FIG. 1 is a block diagram illustrating a video clamping circuit.

A video clamping circuit 10 is shown in FIG. 1 suitable for manufacturing as an integrated circuit using conventional integrated circuit processes. A composite video input signal is applied to emitter-follower transistor 12 which acts as a source to drive shielded coaxial cable 14. The collector of transistor 12 is coupled to power supply conductor 16 operating at a positive potential $V_{CC}$ such as 5.0 volts. A load resistor 18 is coupled between the emitter of transistor 12 and power supply conductor 20 operating at ground potential. Resistor 22 and capacitor 24 are serially coupled between the emitter of transistor 12 and node 26. Resistor 22 may be selected at 75 ohms, while capacitor 24 has a value of say 470 $\mu f$. Capacitor 24 AC-couples the video input signal thereby blocking the DC component.

Transistor 12 may be part of a consumer video source such as the output of a video cassette recorder (VCR). Coaxial cable 14 may therefore cover some distance for example from the VCR output to terminate at node 26 at the video input to the television receiver. A 75 ohm load resistor 28 is coupled between node 26 and power supply conductor 20. A capacitor 30 selected at say 1.0 $\mu f$ is coupled between node 26 and pin 32 external to IC 34. Capacitor 30 may be placed internal to IC 34 in series with pin 32 if the technology permits. Pin 32 is coupled to node 38 within IC 34. Current supply 40 sources current $I_{40}$ into node 38 in response to a control signal from comparator 42. Gating circuit 44 is coupled between the output of comparator 42 and the control input of current source 40 to enable the control signal in response to an external control signal. The external control signal may for example be a so called 2H CONTROL signal occurring twice the horizontal sweep frequency. Current supply 46 sinks current $I_{46}$ from node 38 into power supply conductor 20 to discharge capacitor 30. The non-inverting input of comparator 42 receives reference potential $V_{REF}$ operating at say 1.0 volt. The inverting input of comparator 42 is coupled to node 38.

The composite video input signal applied at the base of transistor 12 typically contains luma (brightness) and chroma (color) information to control the intensity and color of the television image. The luma data uses varying amplitude to represent brightness, where the higher amplitudes are white and lower amplitudes are black. The chroma data is superimposed as a 3.58 MHz subcarrier on the luma signal. The chroma signal actually contains two chrominance components modulated in quadrature on the subcarrier. The phase and amplitude from the demodulated chroma signal relative to a 3.58 MHz reference burst frequency introduced at the beginning of each horizontal sweep determines the particular color of the pixels on the television screen.

Figure 2:
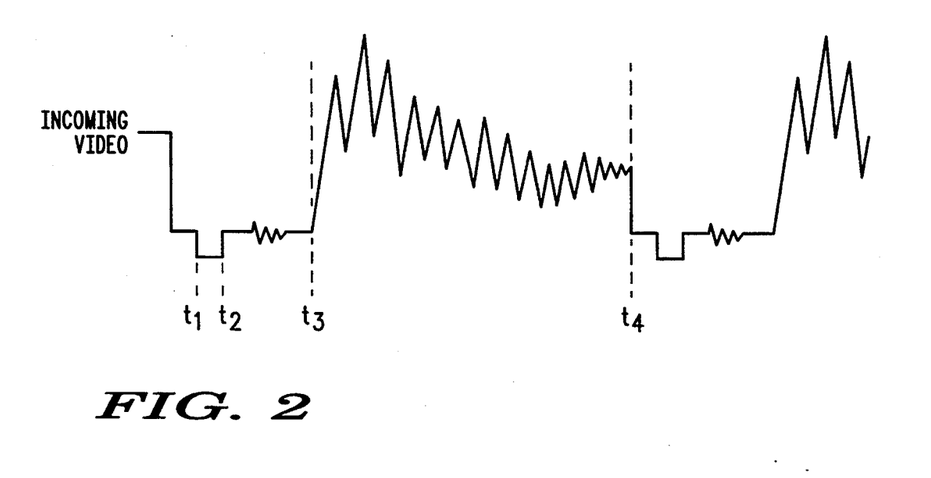
FIG. 2 is a waveform plot useful in explaining the invention.

The waveform plot shown in FIG. 2 is representative of the incoming video signal at node 26. The area between times $t_1$ and $t_2$ is commonly known as the sync pulse and is used to set the luma reference. A typical duration for the sync tip is 4.7 $\mu s$. The area between times $t_2$ and $t_3$ is the backporch. The 3.58 MHz reference burst occurs during the backporch to establish the reference phase from which to compare chroma phase.

The backporch includes a 0.6 μs for blanking, 2.5 μs for the reference burst and another 1.6 μs for blanking. The actual video information for one horizontal sweep across the television screen occurs between times $t_3$ and $t_4$ for 52 μs.

As the black and white luma level in the video signal changes, the average picture level (APL) varies causing the entire waveform shown in FIG. 2 to shift up and down. That is, changes in the APL changes the average DC offset of the video waveform. More white in the picture moves the blanking level lower while more black moves the blanking level higher. The changing DC offset in the incoming video signal dependent on the black and white level makes it difficult to read the luma and chroma references and therefore more complicated to decode the video information.

For most signal processing applications it is important to keep the sync level or the blanking level at a predetermined fixed DC level to simplify decoding of the video information. Hence, a key feature of the present invention is to clamp the absolute signal level for the sync pulse, or the backporch, at input pin 32 of IC 34 to a predetermined value even while the average picture level changes in response to changes in the black and white intensity levels. The present invention is particularly useful in picture-in-picture applications where it is important to precisely match the luma blanking level.

The operation of video clamping circuit 10 proceeds as follows. The video signal arrives at node 26 AC-coupled by capacitor 24. Since AC coupling causes the level of the blanking and sync portions of the signal to vary with the APL, it is desired to clamp or restore these portions of the signal to a fixed level. By varying the DC voltage across capacitor 30, pin 32 can receive the sync or blanking at a desired predetermined DC level. The DC voltage across capacitor 30 is changed by adding or removing charge using current source 40 and current sink 46.

Current sink 46 continuously sinks current $I_{46}$, say 20 microamps (μa), from capacitor 30 through pin 32 and node 38. This causes the voltage across capacitor 30 to decrease and the blanking or sync level to move lower. If the video signal has a steady APL, for the moment, the sync or blanking level at node 26 is steady. In this condition, it is desirable to maintain the voltage across capacitor 30 steady. Since current sink 46 causes a slight decrease in voltage across capacitor 30, it is necessary to restore this slight decrease in level using current source 40.

Current source 40 operating at say 700 μa needs to be turned on for only a portion of the video line time to balance the continuous sink of current sink 46. For the example values, this time is 20 μa divided by 700 μa times the line time of 63.5 μs which equals 1.81 μs. The voltage across capacitor 30 to remains steady with only a very small sawtooth waveform. If the APL is changing and causes the sync tip level to move down at node 26, current source 40 can be turned on for a longer period to cause the voltage across capacitor 30 to increase. If the sync tip level at node 26 is moving up, current source 40 is turned on for a shorter period of time and the voltage across capacitor 30 drops.

For the moment, ignore gating circuit 44 and assume that comparator 42 drives the control input of current source 40 directly. When the sync signal starting at time $t_1$ in FIG. 2 arrives at the negative input of comparator 42 and it is below $V_{REF}$, current source 40 turns on. After a short time, the voltage at node 38 rises due to the 700 μa current and comparator 42 turns off current source 40. If the voltage at the sync tip is too low, it takes longer for the voltage to rise and current source 40 stays on longer. If the voltage at the sync tip is too high the voltage rises sooner and current source 40 is on for a shorter period. In this way the sync tip voltage is clamped at input pin 32.

While this circuit without gating circuit 44 works well for some applications, an improvement is possible. When current source 40 turns on, the voltage at node 38 increases immediately by 26 mV. Depending upon the speed of response and input threshold of comparator 42 and current source 40, they may begin to turn off. If the gain of comparator 42 and current source 40 are high enough, a low level oscillation may develop. In practical application it is frequently observed that the trailing edge of the sync pulse at time t2 in FIG. 2 causes the cut off of the oscillation of the circuit. During the vertical interval there are wide sync pulses that fail to cut off the oscillation and the clamping function allows the sync tip voltage to rise. If this rise is high enough, it could result in faulty operation during the vertical interval. In many applications, the above mentioned oscillations and clamping drift are acceptable.

In cases where higher performance is required, the addition of gating circuit 44 corrects the above mentioned problems. Gating circuit 44 allows only one pulse to pass to current source 40 during each video line time. In this way the oscillations are stopped and the clamping level drift is avoided. The sync tip voltage settles to a point where the comparator overdrive at the leading edge of the sync signal at time $t_1$ in FIG. 2 is sufficient to maintain current source 40 on for the desired length of time. Once current source 40 is turned off, it can't be turned on again until the next line time regardless of the output of comparator 42.

Figure 3:
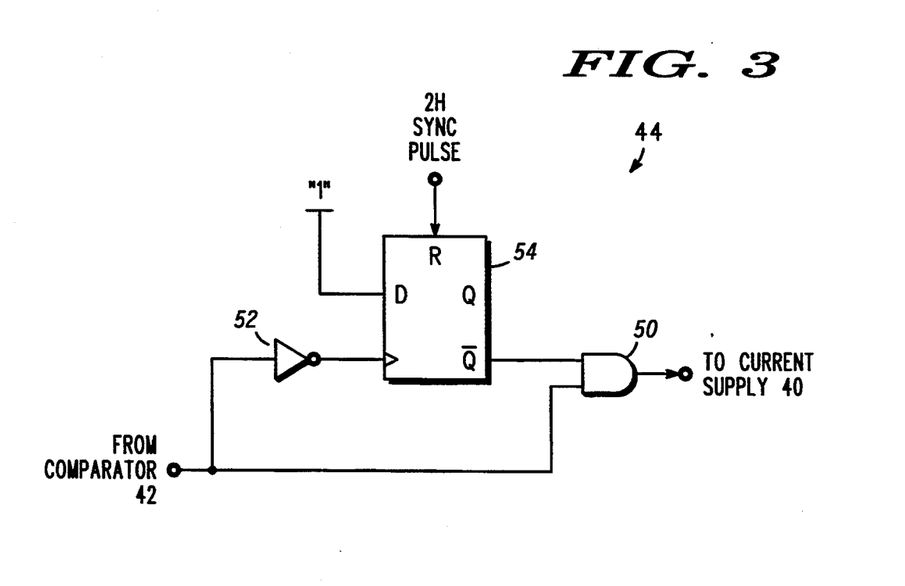
FIG. 3 is a schematic diagram illustrating the gating circuit of FIG. 1.

FIG. 3 illustrates one way of implementing gating circuit 44. Assume that flipflop 54 is in the zero state following reset, i.e. Q-output at logic zero and $\overline{Q}$-output at logic one. When comparator 42 senses the leading edge of the sync signal at time $t_1$ in FIG. 2 to be below $V_{REF}$, it produces a logic one at one input of AND gate 50. With the logic one signal from the $\overline{Q}$-output of flipflop 54, current source 40 is turned on. When the voltage at the input of comparator 42 input rises sufficiently, it turns off, sending a logic zero to gating circuit 44. The low-going signal is inverted by inverter 52 and triggers flipflop 54 to a logic one state, i.e. Q-output at logic one and $\overline{Q}$-output at logic zero. The logic zero at $\overline{Q}$-output of flipflop 54 produces a logic zero at the output of AND gate 50 and keeps current source 40 off even if comparator 42 output should go high again. Flipflop 54 is reset by a so called "2H" control pulse since it occurs twice during the horizontal line time. In this case, it is desired to have it occur just before the half line point and just before the horizontal sync pulse. Thus, the pulse resets gating circuit 44 to allow the next horizontal sync pulse to activate current source 40.

Another embodiment for the gating circuit may include a one shot (not shown) replacing flipflop 54. The one shot is triggered on the falling edge of the output signal from comparator 42 and supplies the logic zero to disable AND gate 50. For applications where the 2 H control pulse is not available, a counter or delay circuit may delay the reset until well into the horizontal line sweep.

Figure 4:
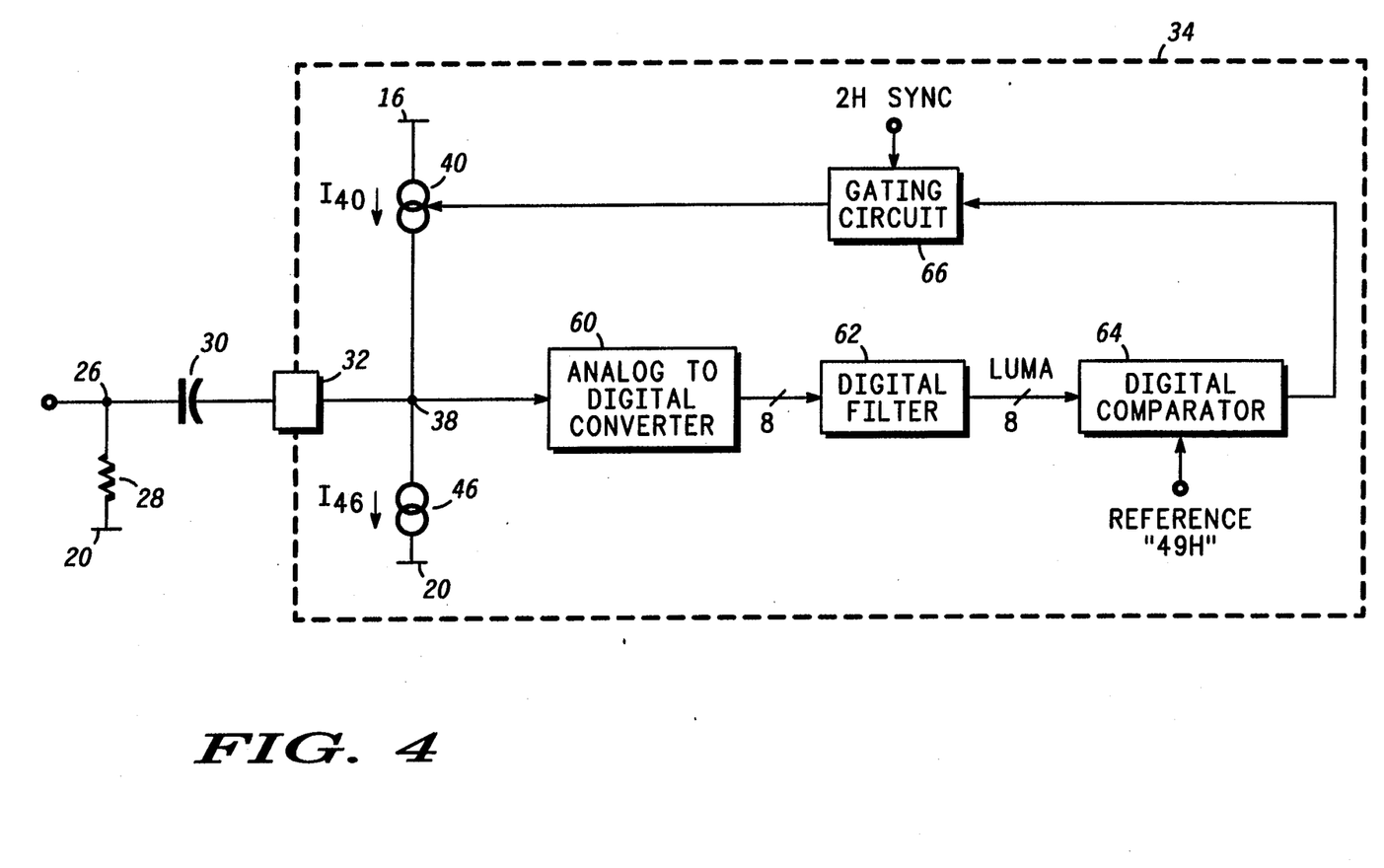
FIG. 4 is a block diagram illustrating an alternate embodiment of the video clamping circuit.

Another embodiment of the video clamping circuit is shown in FIG. 4 with a digital comparator setting the reference level. Circuit elements have similar functions are assigned the same reference number used in FIG. 1. The analog input signal at pin 32 is converted to a series of multi-bit digital words by analog-to-digital converter (ADC) 60. These words are filtered by digital filter 62 and applied to one input of digital comparator 64. Digital filter 62 is not required in all cases. The other input has the desired sync tip clamping level applied as a digital reference signal from a controller (not shown). The reference signal may be set to "01001001" (49 H in hexadecimal). The output of digital comparator 64 drives gating circuit 66 which generates the control signal pulse for current source 40. Gating circuit 66 follows a similar construction and functions as described for gating circuit 44 in FIG. 1 and need not be present if performance requirements allow. This configuration allows setting the digital level of the clamped signal without concern for ADC offsets and drift and it allows digital processing that may affect the sync tip level to be performed before the level is set in digital comparator 64.

Figure 5:
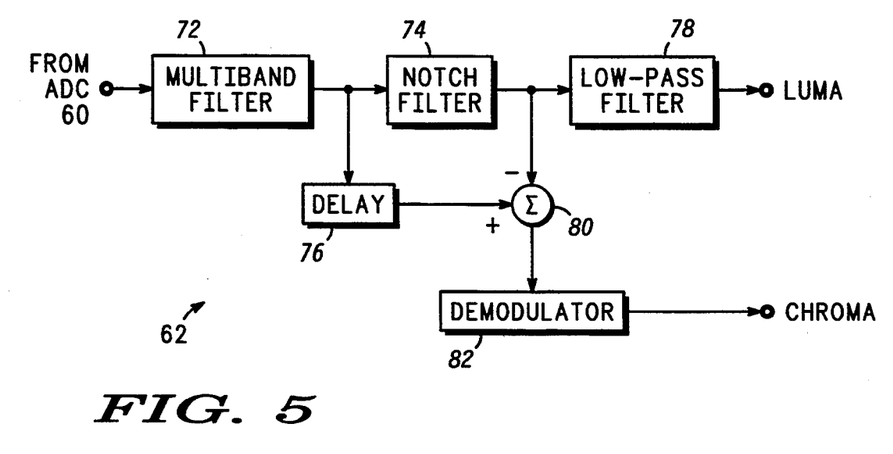
FIG. 5 is a block diagram illustrating a digital multiband filter.

ADC 60 and digital comparator 64 are believed to be well known in the art. Further detail of digital filter 62 is shown in FIG. 5 with the digital input signal from ADC 60 applied at the input of multiband filter 72. The ADC and filters described hereinafter operate at approximately 14.318 Msps (megasamples per second). The output of multiband filter 72 is coupled to an input of notch filter 74 and to an input of delay circuit 76. Delay circuit 76 matches the delay through notch filter 74 although its frequency response is flat. The output of notch filter 74 is processed through low-pass filter 78 for providing the luma data. The output of notch filter 74 is also subtracted from the output signal of delay circuit 76 in junction circuit 80 for providing the modulated chroma data. Demodulator 82 demodulates the chroma data to provide the chrominance components for color as described above. The present digital filter is especially useful for picture-in-picture applications where the luma and chroma data must be transformed to digital form and separately stored in RAM in order to recall a complete picture to display as a reduced size image superimposed on the larger screen image.

Figure 6:
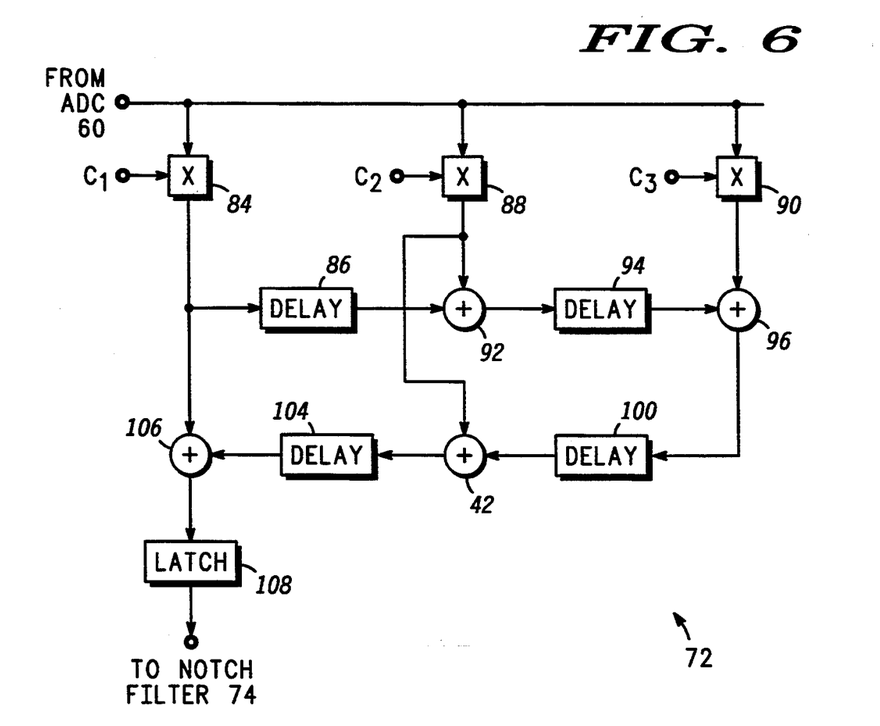
FIG. 6 is a schematic diagram illustrating the multiband filter of FIG. 5.

Multiband filter 72 is shown in further detail in FIG. 6 including digital multiplier 84 having a first input receiving the digital composite video input signal from ADC 60 and a second input receiving coefficient C1. The value of coefficient $C_1$ may be set to −0.0938. The output of multiplier 84 is coupled to the input of delay circuit 86. Given one unit of delay equal to one sample period of the data (1/(4*3.58 MHz burst frequency), or approx. 69.84 nanoseconds), delay circuit 86 is set to have four time units of delay. As noted above, multiband filter 72 operates at 14.318 Msps (4*3.58 MHz burst frequency). Delay circuit 86 may include a serially-coupled string of four inverters for each bit in the data path each tuned for one time unit of delay. Alternately, delay circuit 86 may comprise a string of four serially-coupled latches, i.e. a shift register, for each bit in the data path with the delay imposed by clocking on each latch. The digital input signal is also applied at first inputs of digital multipliers 88 and 90, while the second inputs of the same receive coefficients $C_2$ and $C_3$ having values 0.2188 and 0.75, respectively. Multipliers 84, 88 and 90 may be implemented as adder circuits. The output signal of multiplier 88 is summed with the output signal of delay circuit 86 in summing junction 92 and then applied at the input of delay circuit 94.

Similarly, the output signal of multiplier 90 is summed with the output signal of delay circuit 94 in summing junction 96 and then applied at the input of delay circuit 100. Summing junction 102 receives the output signal from multiplier 88 and the output signal from delay circuit 100 and provides a signal to the input of delay circuit 104. Summing junction 106 receives the output signal from multiplier 84 and the output signal from delay circuit 104 and provides a signal to the input of latch 108. The output of latch 108 is coupled to the input of notch filter 74 for providing a low-pass response at and below 1.0 MHz and a band-pass response between 2.58 and 4.58 MHz and a high-pass response above 6.16 MHz. Delay circuits 94, 100 and 104 each have four time units of delay. As noted above, delay circuits 94, 100 and 104 may each comprise a string of four serially coupled latches with the delay imposed by clocking on each latch. Additional stages like multiplier 88, delay circuit 94, summing junction 92, delay circuit 100 and summing junction 102 with corresponding coefficients may be added to modify the frequency response characteristics of multiband filter 72.

Figure 7:
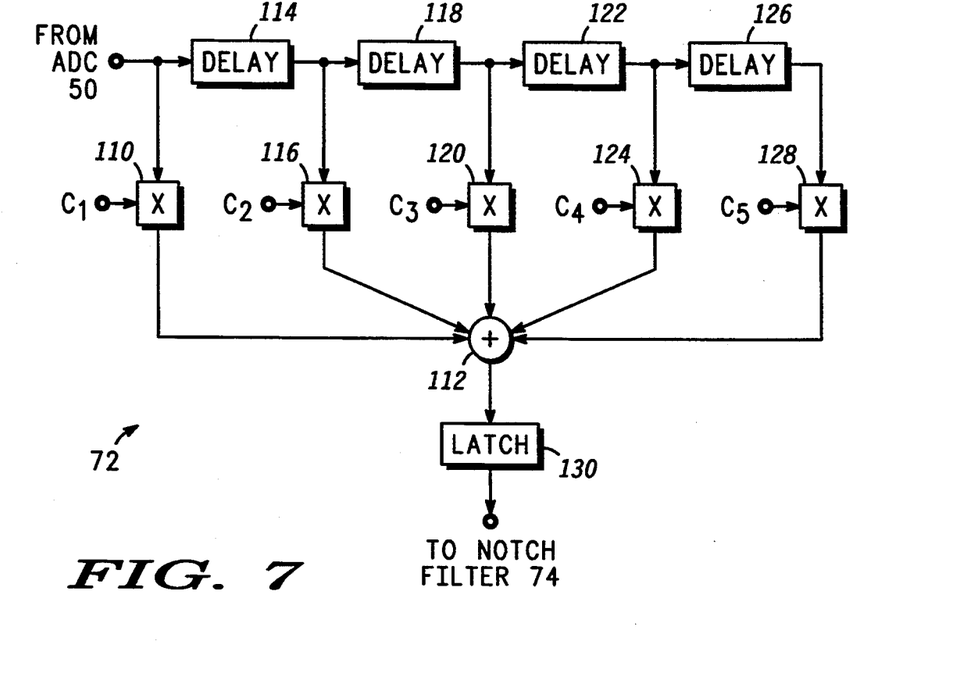
FIG. 7 is a schematic diagram illustrating an alternate embodiment of the multiband filter of FIG. 5.

Turning to FIG. 7, an alternate embodiment of multiband filter 72 is shown including digital multiplier 110 having a first input receiving the digital composite video input signal from ADC 60 and a second input receiving coefficient $C_1$. The output of multiplier 110 is coupled to a first input of summing junction 112. The video signal is also applied to the input of delay circuit 114. The output of delay circuit 114 is coupled to a first input of digital multiplier 116 and to the input of delay circuit 118. A second input of multiplier 116 receives coefficient $C_2$, while its output is coupled to a second input of summing junction 112. The output of delay circuit 118 is coupled to a first input of digital multiplier 120 and to the input of delay circuit 122. A second input of multiplier 120 receives coefficient $C_3$, while its output is coupled to a third input of summing junction 112. The values of coefficients $C_1$, $C_2$ and $C_3$ may be set to −0.0938, 0.2188 and 0.75, respectively. The output of delay circuit 122 is coupled to a first input of digital multiplier 124 and to the input of delay circuit 126. Delay circuits 114, 118, 122 and 126 each have four time units of delay. A second input of multiplier 124 receives coefficient $C_4$, while its output is coupled to a fourth input of summing junction 112. The output of delay circuit 126 is coupled to a first input of digital multiplier 128, while a second input of multiplier 128 receives coefficient $C_5$. The values of coefficients $C_4$ and $C_5$ may be set to 0.2188 and −0.0938, respectively. The output of multiplier 128 is coupled to a fifth input of summing junction 112. The output of summing junction 112 is stored in latch 130 and provides a digital output signal having a low-pass response at and below 1.0 MHz, a band-pass response between 2.58 and 4.58 MHz and a high-pass response above 6.16 MHz to notch filter 74.

Figure 8:
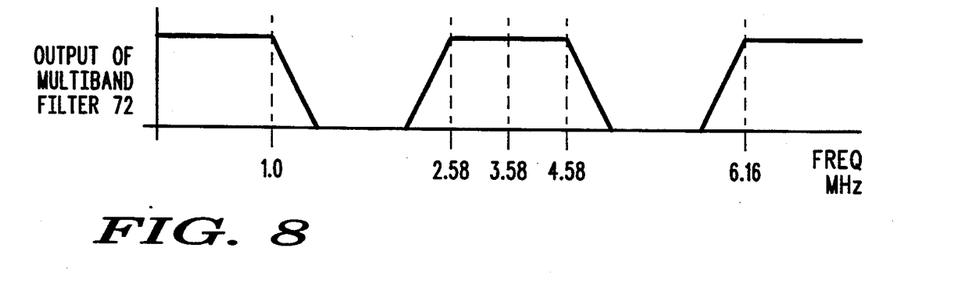
FIG. 8 is a frequency response plot useful in the explanation of the multiband filters of FIGS. 6–8.

The desired frequency response of multiband filter 72 is illustrated in FIG. 8 with a low-pass response at 1.0 MHz and below to pass the luma data and a 2.0 MHz wide band-pass response centered at 3.58 MHz to pass the modulated chroma data. Multiband filter 72 also passes frequencies above 6.16 MHz although typically no useful data appears in that band. For the frequency response shown in FIG. 8, the embodiment of FIG. 6 comprises four multiplier stages with coefficients C1–C4 selected at −0.0137, −0.0586, 0.2188 and 0.75, respectively. Alternately, the embodiment of FIG. 7 would include seven multiplier stages with coefficients C1–C7 selected at −0.0137, −0.0586, 0.2188, 0.75, 0.2188, −0.0586, and −0.0137, respectively.

Figure 9:
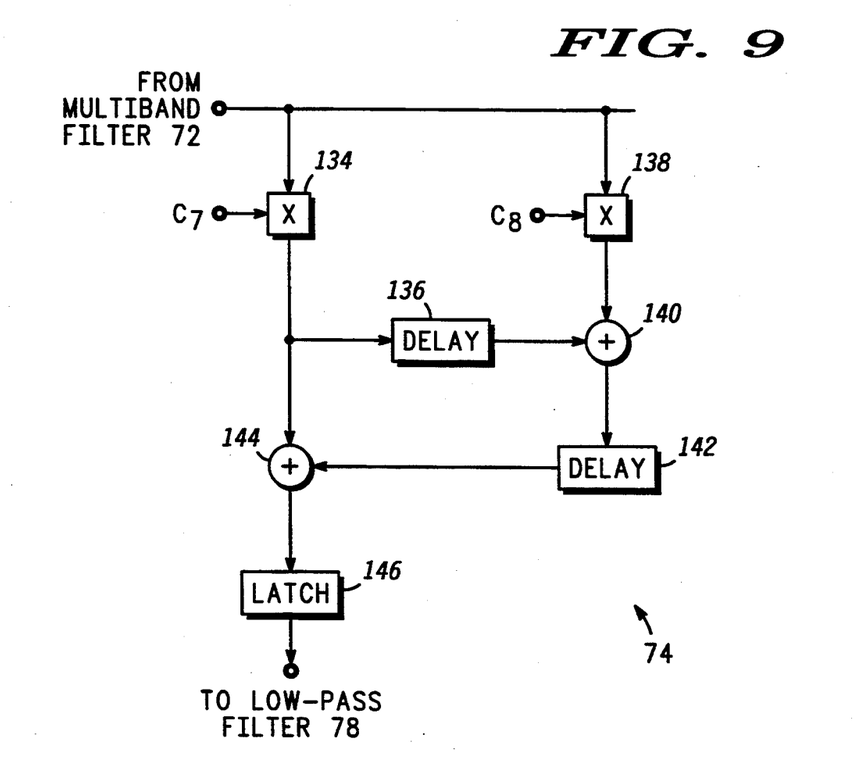
FIG. 9 is a schematic diagram illustrating the notch filter of FIG. 5.

Notch filter 74 is shown in FIG. 9 including digital multiplier 134 having a first input receiving the output signal from multiband filter 72 and a second input receiving coefficient $C_7$. The output of multiplier 134 is coupled to the input of delay circuit 136. The output signal from multiband filter 72 is also applied at a first input of digital multiplier 138, while the second input of the same receives coefficient $C_8$. Multipliers 134 and 138 may be implemented as adder circuits. The values of coefficients $C_7$ and $C_8$ may be set to 0.25 and 0.5, respectively. The output signal of multiplier 138 is summed with the output signal of delay circuit 136 in summing junction 140 and then applied at the input of delay circuit 142. Summing junction 144 receives the output signal from multiplier 134 and the output signal from delay circuit 142 and provides a digital signal rejecting the band-pass response between 2.58 and 4.58 MHz while passing the low-pass response below 1.0 MHz and frequencies above 6.16 MHz to the input of latch 146. The output of latch 146 is coupled to the input of low-pass filter 78.

Figure 10:
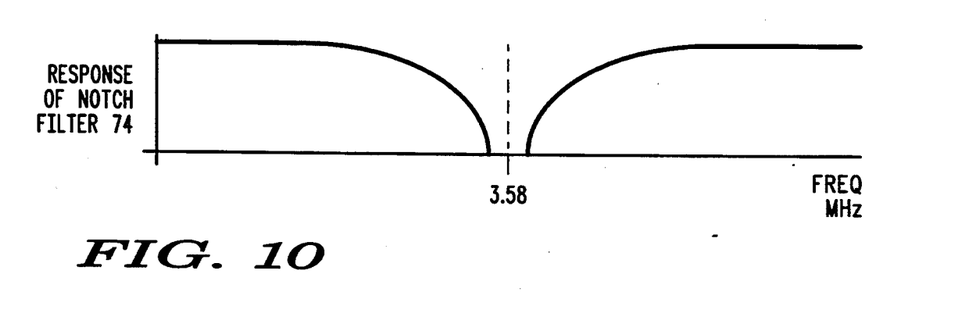
FIGS. 10–11 are frequency response plots useful in the explanation of the notch filter of FIG. 9.
Figure 11:
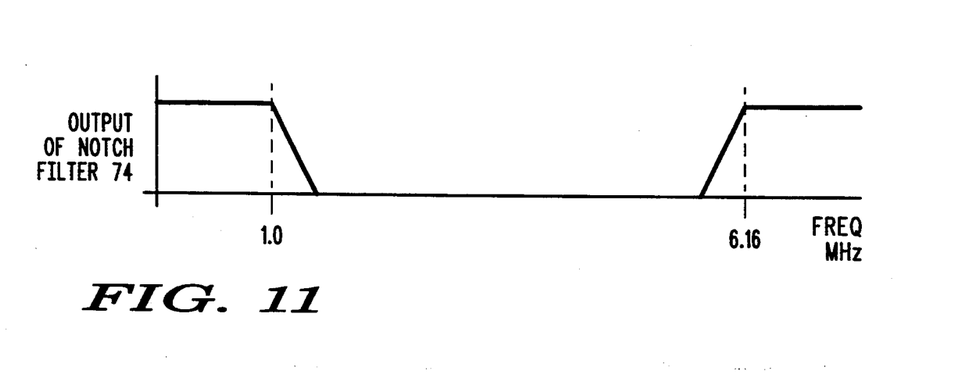

Delay circuits 136 and 142 each have two units of delay. As noted above, delay circuits 136 and 142 may each comprise a string of two serially coupled latches with the delay imposed by clocking on each latch. An alternate embodiment of notch filter 74 may following a similar construction as described in FIG. 7 using three coefficients of value 0.25, 0.5 and 0.25. The delay circuits of FIG. 7 would have two units of delay each to implement notch filter 74. The frequency response of notch filter 74 is illustrated in FIG. 10 with a band-rejection notch centered at 3.58 MHz. Hence, notch filter 74 eliminates the 2.58 to 4.58 MHz band shown in FIG. 8, i.e. the modulated chroma data. The frequency response from the output signal of ADC 60 through the combination of filter 72 and filter 74, i.e. at the output of notch filter 74, is illustrated in FIG. 11 with a band reject notch between 1.0 MHz and 6.16 MHz.

By low-pass filtering the frequency response shown in FIG. 11, only the useful luma data at 1.0 MHz and below remains at the output of low-pass filter 78. The digital luma data may then be stored in RAM. One embodiment of low-pass filter 78 follows a similar construction as notch filter 74 shown in FIG. 9. Delay circuits like 136 and 142 in low-pass filter 78 involve only one time unit of delay with coefficients $C_7$ and $C_8$ selected at 0.25 and 0.5, respectively. Alternately, low-pass filter 78 may be implemented as shown in FIG. 7 with one time unit per delay circuit and three coefficients set to 0.25, 0.5 and 0.25, respectively.

To isolate the chroma data, the output signal of notch filter 74 is subtracted from the output signal of delay circuit 76. Delay circuit 76 delays the frequency response shown in FIG. 8 to match the time delay through notch filter 74. The signal content at 1.0 MHz and below is removed by the subtraction process as is any signal content above 6.16 MHz. Thus, the subtraction yield only the 2.58 to 3.58 band-pass, i.e. the modulated chroma data at the output of junction circuit 80, as shown in FIG. 11. Demodulator 82 demodulates the chroma data for providing digital chrominance components which can be stored in RAM.

Thus, multiband filter passes luma and chroma data in their corresponding bands and then notches out the band-pass chroma data to isolate the luma data. Subtracting the notched response from a delay multiband signal leaves the chroma data which may then be demodulated to retrieve the digital chrominance components. Using the multiband filter for processing both luma and chroma data reduces the total area needed for the digital filter.

Figure 13:
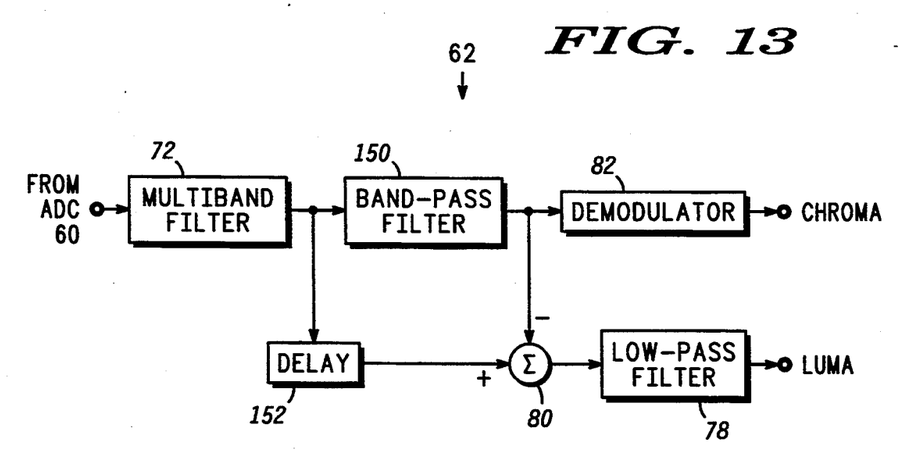
FIG. 13 is a block diagram illustrating an alternate embodiment of the digital multiband filter.

An alternate embodiment digital filter 62 is illustrated in FIG. 13. Components having the same reference number used in FIG. 5 perform a similar function. The digital signal from ADC 60 is applied at the input of multiband filter 72, while the output of multiband filter 72 is coupled to an input of band-pass filter 150 and to an input of delay circuit 152. Delay circuit 152 matches the delay through band-pass filter 150 although its frequency response is flat. The output of band-pass filter 150 is also subtracted from the output signal of delay circuit 152 in junction circuit 80 for providing the luma data. Demodulator 82 demodulates the chroma data to provide the chrominance components for color as described above.

Figure 12:
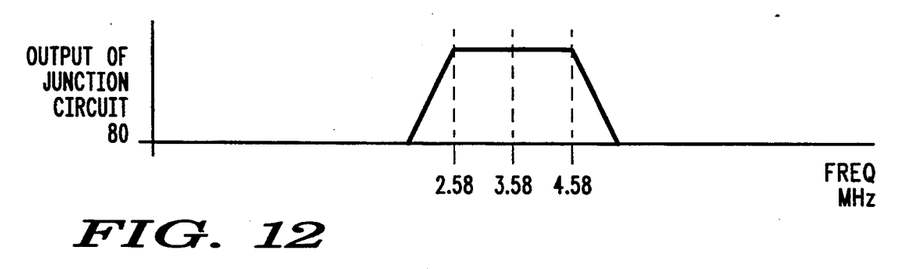
FIG. 12 is a frequency response plot useful in the explanation of the junction circuit of FIG. 5.

The output signal from multiband filter 72 of FIG. 13 follows the same frequency response shown in FIG. 8. Band-pass filter 150 centered at 3.58 MHz with a 2.0 MHz bandwidth rejects the luma data below 1.0 MHz and any high frequencies above 6.16 MHz, similar to that shown in FIG. 12. Band-pass filter 150 may be implemented as shown in FIG. 9 with coefficient $C_7$ set to −0.25. Delay circuits 136 and 142 would each have two time units of delay. Only modulated chroma data remains at the output of band-pass filter 150. By using junction 80 to subtract the frequency response of FIG. 12 from the frequency response of FIG. 8 at the output of multiband filter 72, and low-pass filtering the result, only the luma data remains at the output of low-pass filter 78.

Returning to FIG. 4, the 1.0 $\mu f$ capacitor 30 in series between node 26 and pin 32 is charged and discharged as required to clamp the video signal at pin 32. Current sink 46 continuously sinks current $I_{46}$ of 20 $\mu a$ to discharge capacitor 30. The video signal at pin 32 is converted to digital form and filtered to isolate the luma signal which is then compared to the digital reference 49 H. Digital comparator 64 continuously compares the digitized video signal to the reference value. If the digitized video signal is less than the reference, then the output of digital comparator 64 goes high to trigger gating circuit 66 and enable current source 40 to source current $I_{40}$ of 700 $\mu a$. Gating circuit 66 follows a similar operation and construction as described in FIG. 3. The current $I_{40}$ recharges capacitor 30 while supplying the 20 $\mu a$ sunk by current sink 46. Digital comparator 64 enables current source 40 to establish a voltage on node 38 to match the digital reference signal. By using digital comparator 64, the clamping circuit may digitally set and change clamping level reference in real time to clamp either the sync tip pulse. Changing the digital reference is much easier than changing analog comparators which must be re-calculated and re-simulated.

If the APL is changing and causes the sync tip level to move down at node 26, current source 40 can be turned on for a longer period to cause the voltage across capacitor 30 to increase. If the sync tip level at node 26 is moving up, current source 40 is turned on for a shorter period of time and the voltage across capacitor 30 drops.

If the APL remains constant for some time the charge into capacitor 30 equals that discharged by current sink 46 during the horizontal sweep line time. Comparator 64 enables current source 40 to maintain a constant voltage across capacitor 30. The input voltage to pin 32 is thus clamped as determined by the reference signal. Again, series capacitor 30 allows use of the same pin receiving the incoming video signal and therefore eliminates the need for any additional IC pins.

Figure 14:
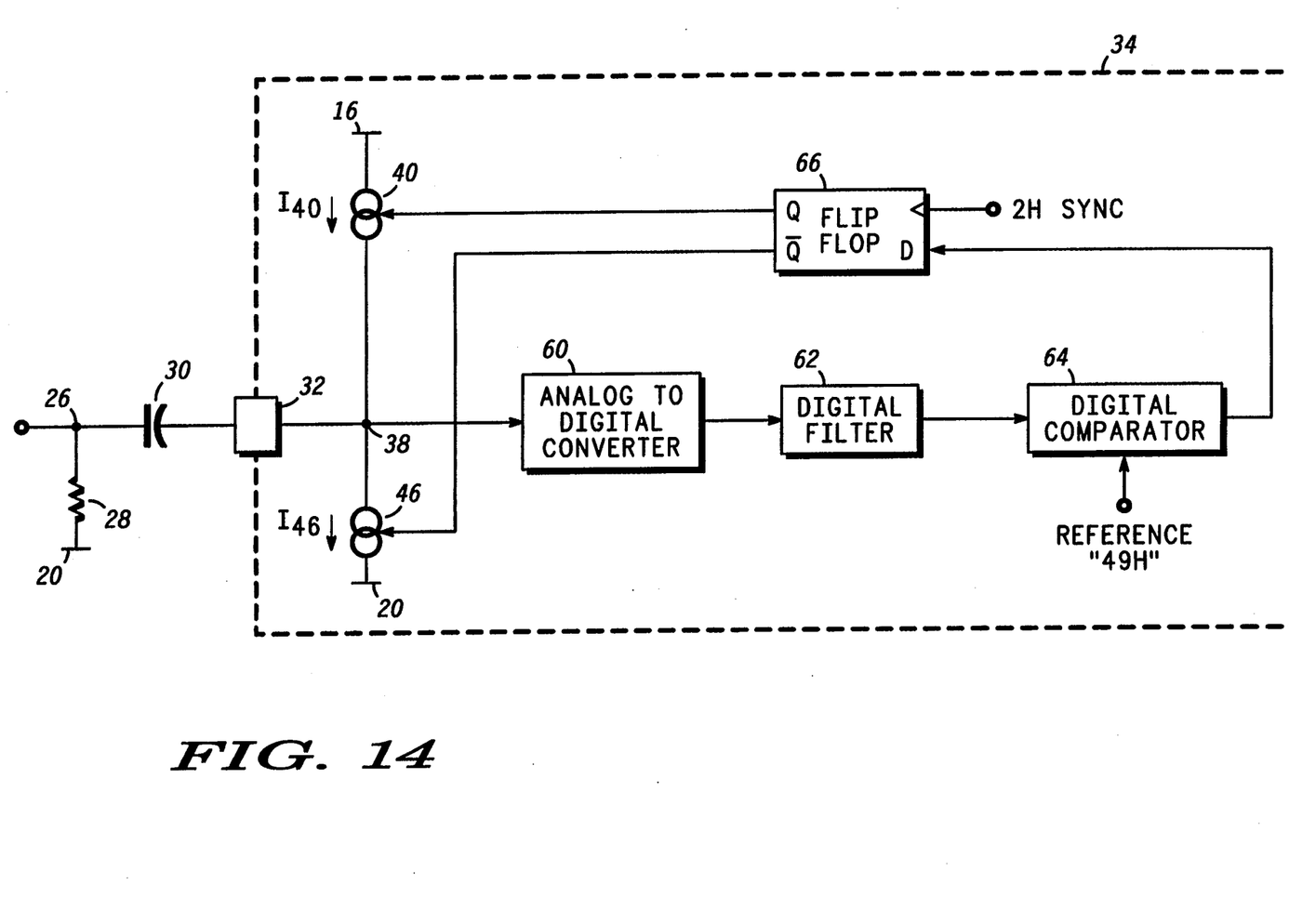
FIG. 14 is a block diagram illustrating another video clamping circuit.

Another video clamping circuit is shown in FIG. 14 that performs the so called backporch clamping. Circuit elements have similar functions are assigned the same reference number used in FIG. 4. Backporch clamping is often required when the sync amplitude is uncertain and/or when reference to the blanking level is required. Current source 40 and current sink 46 are of equal value, say 20 μa. Either current source 40 or current sink 46 is on for the entire line time. If the incoming video signal has a steady APL, the source and sink alternate lines to maintain the voltage across capacitor 30 at a steady value, except for a small triangular wave. If the blanking level at node 26 is rising, current sink 46 is on for as many lines in a row as needed to reduce the voltage on capacitor 30. To achieve this control, the video signal is converted as before in ADC 60 and possibly filtered through digital filter 62 if needed and compared to a reference in digital comparator 64. Flipflop 68 samples the output of digital comparator 64 during the backporch time using an appropriate clock signal. The outputs of flipflop 68 allow either current source 40 or current sink 46 to be on at once. To allow an analog reference voltage to be used, ADC 60, digital filter 62, and digital comparator 64 can be replaced by comparator 42 of FIG. 1, where the output of the analog comparator drives the data input of flipflop 68.

A possible variation on the backporch clamp circuit is the use of a window comparator in either the digital or analog version that allows both the current source and the current sink to be off when the backporch level is satisfactory and doesn't need changing. Combining the sync tip and the backporch clamp circuits at the same pin of an IC may be desirable to allow sync tip clamping to be used until the circuits that generate the timing signals have locked onto the incoming sync and then switching to backporch clamping for improved performance. In this case, a single current sink can be used with two different current sources. The current sink would be gated on at all times during sync tip clamp operation.

Additional variations would include use of an appropriate value resistor, inside or outside the IC that replaces current sink 46 and the use of a fixed, always on current sink in the backporch clamp, with a current source of twice the sink value, that would negate the sink plus charge the capacitor 30 when turned on.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A clamping circuit, comprising:
   a capacitor having a first terminal receiving an input signal and a second terminal coupled to a first node;
   first current supply means having a control input and an output for providing a first current into said first node;
   second current supply means having an output coupled to said first node for sinking a second current;
   a comparator having first and second inputs and an output, said first input being coupled to said first node, said second input receiving a reference potential, said output being coupled to said control input of said first current supply means;
   a flipflop having a data input, a clock input, a reset input and an output, said data input being coupled for receiving a signal having a first logic state, said reset input being coupled for receiving a sync pulse, said clock input being coupled to said output of said comparator; and
   an AND gate having first and second inputs and an output, said first input being coupled to said output of said flipflop, said second input being coupled to said output of said comparator, said output being coupled to said control input of said first current supply means.

2. The clamping circuit of claim 1 wherein said flipflop and said gate operate in response to a sync pulse for passing a single pulse from said output of said comparator to said control input of said first current supply means during a single sync pulse.

3. The clamping circuit of claim 2 wherein said first node is coupled to one pin of an integrated circuit package.

4. The clamping circuit of claim 3 further including a resistor coupled between said first terminal of said capacitor and a first power supply conductor.

5. The clamping circuit of claim 4 wherein said second current supply means includes a resistor coupled between said first node and said first power supply conductor.

6. A clamping circuit coupled to a pin of an integrated circuit package, comprising:
   a capacitor receiving an input signal and serially coupled with the pin of the integrated circuit package at a first node;
   first current supply means having a control input and an output for providing a first current into said first node;
   second current supply means having an output coupled to said first node for sinking a second current; and
   circuit means for comparing a voltage developed at said first node against a reference signal and generating a control signal for application to said control input of said first current supply means, said circuit means including,
   (a) a digital-to-analog converter having an input coupled to said first node and an output,
   (b) a digital filter having an input coupled to said output of said digital-to-analog converter and having an output,
   (c) a digital comparator having first and second inputs and an output, said first input being coupled to said output of said digital filter, said second input receiving said reference signal, and
   (d) a gating circuit having a data input, an enable input, and an output, said data input being coupled to said output of said digital comparator, said enable input receiving a clock signal, said output being coupled to said control input of said first current supply means.

7. The clamping circuit of claim 6 further including a resistor coupled between a first terminal of said capacitor and a first power supply conductor.

8. The clamping circuit of claim 7 wherein said second current supply means includes a resistor coupled between said first node and said first power supply conductor.

9. A clamping circuit coupled to a pin an integrated circuit package, comprising:

a capacitor having a first terminal receiving an input signal and a second terminal coupled to the pin of the integrated circuit package at a first node;

first current supply means having a control input and an output for providing a first current into said first node;

second current supply means having a control input and an output coupled to said first node for sinking a second current; and circuit means for comparing a voltage developed at said first node against a digital reference signal and generating first and second complementary control signals for application to said control inputs of said first and second current supply means respectively, said circuit means including, (a) a digital-to-analog converter having an input coupled to said first node and an output, (b) a digital filter having an input coupled to said output of said digital-to-analog converter and having an output, (c) a digital comparator having first and second inputs and an output, said first input being coupled to said output of said digital filter, said second input receiving said digital reference signal, and (d) a flipflop having a data input, a clock input and first and second complementary outputs, said data input being coupled to said output of said digital comparator, said clock input receiving a clock signal, said first output being coupled to said control input of said first current supply means, said second output being coupled to said control input of said second current supply means.

10. The clamping circuit of claim 9 further including a resistor coupled between said first terminal of said capacitor and a first power supply conductor.

11. A method of clamping an input voltage applied at a pin of an integrated circuit package, comprising the steps:

providing a series capacitor into the pin of the integrated circuit package at a first node;

converting the input voltage to a digital signal representative of the input voltage;

filtering said digital signal for providing a filtered digital signal;

comparing said filtered digital signal to a reference signal to generate a compare signal;

gating said compare signal at each occurrence of a clock signal to generate first and second complementary control signals;

sourcing current into said first node in response to said first complementary control signal to charge said series capacitor; and sinking current from said first node at the pin of the integrated circuit package to discharge said series capacitor in response to said second complementary control signal.

* * * * *

UNITED STATES PATENT AND TRADEMARK OFFICE
CERTIFICATE OF CORRECTION

PATENT NO. : 5,410,366
DATED : April 25, 1995
INVENTOR(S) : David A. Hostetler

It is certified that error appears in the above-indentified patent and that said Letters Patent is hereby corrected as shown below:

In column 11, line 3, claim 9, after "pin" insert therefor --of--.

Signed and Sealed this

Twenty-first Day of November, 1995

Attest:

BRUCE LEHMAN

Attesting Officer

Commissioner of Patents and Trademarks